3,674,595
METHOD FOR APPLYING PRESSURE SENSITIVE ADHESIVE TO SANITARY NAPKINS
Robert J. Roeder, Appleton, Wis., assignor to Kimberly-Clark Corporation, Neenah, Wis.
No Drawing. Filed May 8, 1970, Ser. No. 35,903
Int. Cl. C09j 5/00
U.S. Cl. 156—306   4 Claims

ABSTRACT OF THE DISCLOSURE

An improved method for applying pressure sensitive adhesive to the bottom surface of sanitary napkins. A pressure sensitive adhesive mass carried on one side of conventional protective release paper is first adhered to the napkin surface. Heat and pressure are then applied to the other side of the release paper. This operation attaches the adhesive more firmly to the porous napkin surface, while reducing the force needed to strip the smooth protective paper from the adhesive when preparing the napkin for use.

BACKGROUND OF THE INVENTION

Pressure sensitive adhesives have been suggested for use with sanitary napkins to serve as means for attaching the napkins to supporting garments. In such structures, a pressure sensitive adhesive mass, or two sided tape, is attached to the bottom surface of the napkin in strategically disposed areas and covered with a removable, usually release coated, protective strip. The prior art contains a number of patents defining napkins of this type. Representative specifications include United States Pats. 2,295,016; 2,838,048; 3,044,467; 3,454,008; 3,463,154; and Swiss Pats. 295,532; 296,828 and 306,502. While each of the products described in these patents provides useful functions, there are two problems in particular which frequently appear. One is that the adhesive is not always attached to the porous surface of the napkin with sufficient tenacity to remain adhered thereto when the protective cover strip is removed prior to use. The second is that all or a portion of the adhesive tends to strip off of and remain with the garment, when the napkin is removed from the garment for disposal after use. In the first instance, if the adhesive stays with the protective strip when it is removed rather than remaining on the napkin, the latter is useless and must be discarded. In the second instance, when the adhesive transfers to the garment it is found difficult to remove the transferred adhesive from the garment, and this also may interfere with the attachment of subsequent napkins. Both conditions are undesirable.

The present invention is directed to a method for applying the pressure sensitive adhesive to a sanitary napkin structure to insure improved bonding of the adhesive to the napkin, while reducing the force needed to strip the protective cover from the adhesive mass prior to use.

SUMMARY OF THE INVENTION

In the improved method, pressure sensitive adhesive carried on one side of a protective release sheet is adhered to the napkin surface at the desired location. It is then pressed firmly in place by a heated ironing or calendering device at a temperature which is sufficiently high to temporarily increase the fluidity of the adhesive but which is not high enough to degrade it or destroy its tack. It was found that for most available adhesives this method resulted in better bonding of the adhesive to the surface of the napkin while achieving easier release of the protective sheet. Apparently the heat and pressure causes the adhesive to migrate to a minor degree into the surface of the porous napkin wrapper to establish a firmer bond. At the same time, the smooth surface of the release sheet reacts in some way with the contacting surface of the adhesive to permit easier release. In any event the method does provide firmer attachment of the adhesive to the napkin while permitting easier release of the protective cover sheet.

DESCRIPTION OF THE PREFERRED EMBODIMENTS

In one example, a tabless sanitary napkin constructed of conventional materials including an elongate absorbent core enclosed in a fluid pervious wrapper had applied to its bottom surface a strip of pressure sensitive adhesive while the latter was on one side of a silicon-coated release paper. Pressure and heat were applied to the other side of the paper by means of a hand iron. The temperature of the iron was about 325° F. and the pressure was applied for approximately 2 seconds. The adhesive used was of a conventional type comprising an acrylic base resin in water emulsion. In this case, it comprised a polyvinyl acetate as the major component with a large amount of polyethylhexylacrylate also present. A number of samples prepared in this manner were compared with a similar number of samples in which the same type of adhesive strip was applied by pressure alone, i.e. in the absence of heat.

The protective cover sheet was then stripped from each of the samples and a visual and tactile comparison made of the results. With the heat-applied samples, it was noted that the cover sheet stripped off cleanly, while all of the adhesive remained on the pad surface. With the samples in which only pressure was employed to attach the adhesive strip, more force was necessary to remove the cover sheet with the result that in some cases the adhesive was also stripped from the pad with the cover, while in others the wrapper fabric itself was torn when the cover did not release itself satisfactorily.

In another example, two-sided pressure sensitive adhesive tape was mounted on one side of a protective cover sheet, positioned on the appropriate surface of a sanitary napkin, and ironed on at a temperature of about 325° F. for a period of approximately 2 seconds. The pressure sensitive adhesive carried on both sides of the tape substrate was a tackified natural rubber, i.e. 1,4-polyisoprene.

As with the first example, a number of additional samples were prepared using the same type of two-sided tape, but applying the tape with pressure only.

The protective cover sheet was again stripped from each of the samples and the results compared. With the heat-applied samples, the tape remained firmly adhered to the napkin and the cover sheet was removed with little effort. With the non-heated samples, the cover sheet was sometimes hard to remove and the tape often stayed with the cover sheet rather than remaining adhered to the napkin.

From the above, it is clear that the heat-pressing step provides a superior product and one which essentially eliminates the problems and failures referred to earlier.

In making sanitary napkins in accordance with this invention, the adhesive material may be applied in various shapes and configurations, i.e. in the form of a single, centrally disposed, elongate strip or as separate strategically located patches near the ends and sides. The adhesive may also be applied directly to the napkin surface and subsequently covered with a protective sheet before applying heat and pressure. Such application may be by printing, extrusion, hot melt application or the like.

While only two specific examples of pressure sensitive adhesive materials are described above, the improved process is applicable to a large number of adhesives presently available on the market. Such pressure sensitive adhesives are normally based on an elastomer such as any of the natural or synthetic rubbers, e.g. pale crepe rubber, smoked sheets, reclaimed rubber, Buna-S and Buna-N type rubbers, polyisoprene, polyisobutylene; and synthetic elastomers such as polyvinyl ethers, polyacrylates and the like. The adhesive mass may be especially compounded or inter-polymerized to provide the balance of adhesiveness characteristic of pressure sensitive adhesives in general. Any of the conventional tackifiers such as rosin, dehydrogenated and hydrogenated rosin, polyterpenes, coumarone-indene resins, polyalkyl styrene and the like may be used in proportions well known in the art. Other ingredients, fillers, antioxidants and pigments may also be included in the adhesive mass if desired.

In the specific examples, it is indicated that the ironing pressure was applied at a temperature of about 325° F. for about 2 seconds. Other temperatures may be used as long as the temperature is not so high, or the length of application not so long, as to destroy the tackiness of the adhesive or to degrade any of the end product structure. A suitable range is in the neighborhood of from about 200° F. to 500° F., the temperature used being dependent upon the time the heat is applied, i.e. the dwell time, and the heat conductivity of the paper. Thus for the specified temperature range dwell times may range from about 3 seconds at the low temperature to only a fraction of a second at the high temperature.

In addition to a silicon-coated release paper, other protective release sheets well known in the art may also be employed, as long as the reduction in stripping force is achieved.

The method is especially applicable to napkins in which the wrapper comprises non-woven fabrics. However, use with other porous fabric materials is also contemplated.

While the methods described in the specific examples comprise hand application of the heat and pressure devices, it will be seen that the invention is readily adaptable for use on production machines where the napkins are fed continuously through a pressure nip with the pressure roll which contacts the protective sheet being heated to suitable temperatures.

What is claimed is:
1. In the method for manufacturing sanitary napkins of the type which comprise an absorbent pad structure enclosed in a fluid pervious wrapper having at least one strip of a pressure sensitive adhesive means disposed on a surface of said wrapper and in which said adhesive is covered by a protective release sheet, the improvement wherein heat and pressure are applied to said release sheet while said sheet is in place over said adhesive, said heat being sufficient to temporarily increase the fluidity of said adhesive to cause said adhesive to migrate to a minor degree into the surface of said wrapper and thereby increase the strength of attachment of said adhesive to said surface while reducing the strength of attachment of said adhesive to said release sheet.

2. The method of claim 1 wherein the temperature applied is in the range of about 200° F. to about 500° F. for a dwell time of from about 3 seconds to only a fraction of a second.

3. The method of claim 1 in which said adhesive means is provided by a tape substrate coated on both sides with pressure sensitive adhesive.

4. The method of claim 1 in which said adhesive is applied directly to the wrapper surface and covered by the protective release sheet before application of the heat.

References Cited
UNITED STATES PATENTS

| | | | |
|---|---|---|---|
| 3,454,008 | 5/1966 | Hendricks | 128—290 |
| 3,374,134 | 3/1968 | Waldman | 156—249 X |
| 2,599,359 | 6/1952 | Banks et al. | 156—289 X |
| 2,608,503 | 8/1952 | Meyer | 156—249 X |

CARL D. QUARFORTH, Primary Examiner

R. L. TATE, Assistant Examiner

U.S. Cl. X.R.

156—249, 289